United States Patent [19]

Brenner

[11] 3,846,580

[45] Nov. 5, 1974

[54] POSITION DETERMINATION DEVICE

[75] Inventor: Alfred E. Brenner, Glenellyn, Ill.

[73] Assignee: Summagraphics Corporation, Fairfield, Conn.

[22] Filed: Dec. 6, 1972

[21] Appl. No.: 312,547

[52] U.S. Cl. .................................................. 178/19

[51] Int. Cl. ............................................ G08c 21/00

[58] Field of Search ............ 340/11, 17; 178/18, 19, 178/20; 179/110 C; 33/1 M

[56] References Cited

UNITED STATES PATENTS

| | | | |
|---|---|---|---|
| 2,613,283 | 10/1952 | Bagno et al. | 340/11 |
| 3,439,317 | 4/1969 | Miller et al. | 178/18 |
| 3,684,828 | 8/1972 | Maher | 178/18 |
| 3,727,002 | 4/1973 | Pear, Jr. | 178/18 |
| R19,461 | 2/1935 | Pierce | 179/110 C |

*Primary Examiner*—Thomas A. Robinson
*Attorney, Agent, or Firm*—Daniel M. Rosen

[57] ABSTRACT

A coordinate digitizer wherein a field generating device is positioned in proximity to the surface at a location to be digitized. Further means are provided for triggering the production of a magnetic field by the field generating device, the magnetic field transducing a propagating vibrational mode into the transmission media. Pick-up means are coupled to the transmission media and respond to the propagating vibrational mode for providing a signal to a utilizational device which will respond to the means triggering production of the field as well as to the pick-up means in order to provide a position signal corresponding to the time of propagation of the vibrational mode from its time of generation to its time of pick-up. The vibrational mode is effected by means of a strain wave magnetostrictively induced by the magnetic field into the transmission media. The transmission media constitutes a plurality of magnetostrictive wires arrayed along the support surface. The magnetic field generating device may be an individual stylus in the shape of a writing implement or a cursor. The field may be energized by means of a series of pulses or by individual pulses as desired.

16 Claims, 11 Drawing Figures

PATENTED NOV 5 1974 3,846,580

SHEET 1 OF 3

POSITION DETERMINATION DEVICE

This invention relates to position determination devices and, more particularly, to coordinate digitization employing strain wave vibrational mode transmission and reception.

Graphical data devices requiring position location are commonly employed in such areas as facsimile transmission and as computer data input devices. The earlier forms of such devices employed a stylus, or cursor, in the form of a writing implement or pointer device mechanically coupled to a set of arms for translating the movement thereof into a sequence of usable information signals. Such arrangements are unsatisfactory in that they present undesirable frictional and inertial limitations. One variation of the foregoing arrangement employed a sheet resistance material to provide an $x/y$ coordinate designation, but such devices often present linearity, resolution and uniformity problems giving rise to erroneous information, and have been generally unreliable.

In other forms, light pens may provide graphical data but require interaction with cathode ray display devices and are thus limited in usefulness. One attempt made to overcome the foregoing difficulties has been the employment of a sonic transducing coordinate digitizer requiring some form of acoustic transmission either through the atmosphere or through a surface to a set of receptor devices. The signal source is in the nature of a vibrational or sonic wave generation device. The vibrational device operates conventionally by the use of tuned crystal generation and pick-up devices acoustically coupled through the sub-surface of a two dimensional digitizing area. The accuracy of tuning is important in such devices and requires extensive constructional detail and expensive components. The sonic wave generation devices rely upon atmospheric transmission of a sound wave generated at the location determined by the sound source with respect to the sound receivers. Use of atmospheric transmission, however, has proven to give rise to inaccuracies, non-uniformity and loss of resolution as a result of variation in effective ambient conditions. The speed of sound will vary considerably over a temperature range, and it is necessary to provide some means of temperature compensation in order to provide accurate reproduceability of coordinate digitization using an atmospheric transmission system. In addition, the atmospheric transmission system is subject to Doppler effect error and propagation time error due to draft conditions, and to external noise conditions, all resulting in erroneous information. Finally, atmospheric transmission systems require a specific sound source, which often proves objectionable from a noise level viewpoint as well as in providing certain discomfort and inconvenience, particularly in light of the requirement of an audible sound source to be positioned at the tip of a writing stylus handheld by an operator.

Another suggested alternative has been deployment of an array of embedded wires positioned in a data surface or subsurface along $x/y$ coordinates. In the embedded wire system, the stylus provides some means for generating a magnetic field which is picked up in the location corresponding to the closest coordinate intersection of the $x/y$ wire position within the subsurface. The signal thus transduced into the subsurface wire array is picked up by means of a suitable receptor located at the ends of the respective wires and the position of the respective wires thereby digitized. Conventional means for accomplishing the foregoing effect have employed digital logic circuitry responsive to the presence of induced pulses along the appropriate $x/y$ wire lines corresponding to the position of the transduced pulses. This method is extremely expensive to reproduce in order to derive the required resolution. In addition, the wires must be precisely positioned within the array, since error due to a misplaced wire will be significant. Further, the system is not absolute, but rather digitizes only with respect to an initial position. An alternative to the foregoing form employs the use of delay lines terminating the $x/y$ wire array, the time delay required for the pulse induced in an $x/y$ wire to traverse the delay line terminating the respective $x/y$ array wires being digitized and thereby providing a digital coordinate location. The foregoing method, however, also provides certain expense in providing the required accuracy necessary for the connection of the delay lines to the $x/y$ array wires. In addition, the foregoing method requires extremely accurate placement of the $x/y$ wire array with respect to the delay lines in order to avoid gross inaccuracies in coordinate position. The care that must be taken in assembling such an array gives rise to a high cost as well as complicating accurate reproduction of information with respect to pluralities of such arrays.

It is, therefore, an object of the present invention to provide an improved coordinate data device.

It is another object of this invention to provide a graphical data device employing pulse generation and pick-up on an absolute coordinate basis.

It is a further object of the invention to substantially eliminate digitizing error in a $x/y$ wire array.

It is another object of this invention to provide a coordinate data device having high accuracy, reliability, and with a degree of economy heretofore unobtainable.

The foregoing objects are realized in a position determination device with the provision of an array of a plurality of transmission media. The transmission media are preferably an array of parallel wires arranged along a horizontal or $x$ axis and a further array of wires arranged along a vertical or $y$ axis. Coordinate location is accomplished by digitizing the time delay required for an induced pulse to traverse the transmission media from a generation point to a reception point. Specifically, a field generating device is positioned in proximity to the surface at a location to be digitized. Further means are provided for triggering the production of a magnetic field by the field generating device, the magnetic field transducing a propagating vibrational mode into the transmission media. Pick-up means are coupled to the transmission media and respond to the propagating vibrational mode for providing a signal to a utilizational device which will respond to the means triggering production of the field as well as to the pick-up means in order to provide a position signal corresponding to the time of propagation of the vibrational mode from its time of generation to its time of pick-up. The vibrational mode is effected by means of a strain wave magnetostrictively induced by the magnetic field into the transmission media. The transmission media constitutes a plurality of magnetostrictive wires arrayed along the support surface. The magnetic field generating device may be an individual stylus in the shape of a writing implement or a cursor. The field may be energized by means of a series of pulses or by individual pulses as desired. In further detail, a data digitizer is coupled both to the pick-up and the field generation device for digitizing the time duration between the field generation and the reception by the pick-up device, thus providing a data signal representative of such duration. The duration is actually a measure of the elapsed time required for the strain wave generated to propagate to the pick-up.

The data thus provided may be fed to a computer memory for temporary or permanent storage and will be retrieved when desired. By storing, and later retrieving, the image may be recalled for display on a suitable cathode ray tube or like display device. The data may also be fed directly to a display device by conversion of the digitized signals to analog magnitude and display thereof as a continuous series of signals on the face of the cathode ray tube. The data may also be used to address a ROM and thereby be transferred into any other format. The data may also be transmitted over dedicated or common carrier communications lines.

The foregoing objects and brief description as well as further objects, features and advantages of the present invention will become more apparent from the following description with reference to the appended drawings wherein.

Figure 1:
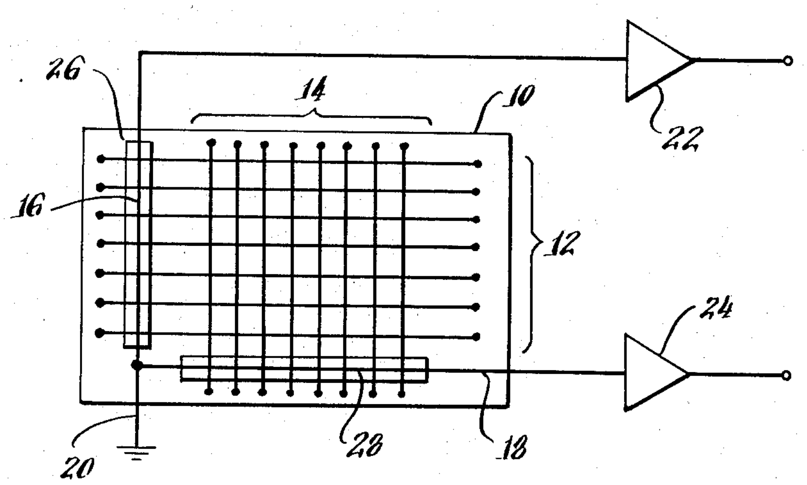
FIG. 1 is a schematic array of the present invention illustrating the relationship between the pick-up and wire array.

The operation of the present invention devolves about the employment of the longitudinal vibrational mode of strain wave propagation. The specific implementation is by means of magnetostructive pulses induced into a plurality of transmission media in the form of magnetostrictive wires arrayed about a data surface in *x/y* coordinate pattern. The array will actually be positioned slightly below the plane of the data surface, but for purposes of this description, data surface shall mean the area which is operative in conjunction with the array for digitizing. Thus, referring now to FIG. 1, a surface illustrated generally as 10 is provided with a first plurality of magnetostrictive wires arranged in parallel fashion along the horizontal or *x* axis of the data surface and designated 12 and a second plurality of vertically arranged magnetostrictive wires corresponding to the y axis and designated 14. Positioned along the left hand edge of the surface 10 is a further vertically oriented wire 16, forming a first pick-up, while along the bottom portion of the surface 10 is a further horizontal wire 18, forming a second pickup. The pickup wires 16 and 18 are commonly terminated by means of a ground 20. Each of the pickup wires 16 and 18 are respectively coupled to output devices 22 and 24 to be explained in further detail below.

The magnetostrictive wires 12 and 14 are typically of a composition which exhibits magnetostrictive properties. One example of such composition is a nickel-chromium vanadium alloy such as is manufactured under the tradename Remendur P manufactured by the Wilbur Driver Manufacturing Company of New Jersey, and another alloy known under the tradename Permendur, Manufactured by the Allegheny Ludlum Corporation of Pittsburgh, Pa. The pick-up wires 16 and 18 may be ordinary conductors such as copper. Beneath each of the respective pick-up wires 16 and 18 is positioned a permanent magnet, designated 26 and 28 respectively. The magnets, although not essential to the concept of the present invention as will become more apparent from the description below, are preferred. The magnets may constitute strip ceramic magnetic material of any conventional form.

Figure 2:
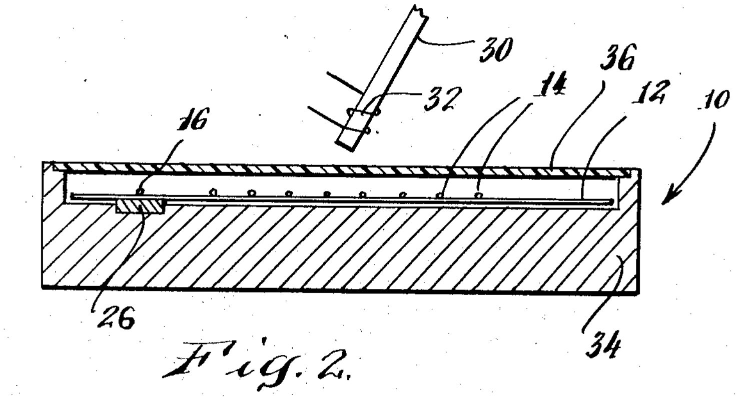
FIG. 2 is a cross sectional view illustrating the wire array and subsurface formation utilized in conjunction with a field generation device.

The construction of the array is illustrated in greater detail in FIG. 2. The positioned field generating device, illustrated as element 30 in FIG. 2, includes a toroidal coil 32, of conventional conductive wire such as copper or the like positioned at or near the edge of the device 30. The device 30 may be a stylus in the form of a marker or pen-type device, or may be in the form of a rounded cursor movable about the surface 10. For purposes of increasing the intensity of the generated field, the core of the device 30 may be constructed of a ferrite magnetic material, and the wire may be wound with 10 or 15 turns about the core.

The surface 10 shown in FIG. 2 is constructed of a base 34 which may be insulating or metallic, such as a copper block, or the like. The ceramic permanent magnets 26 and 28 are placed directly on the surface. The *x*-array of wires 12 are then placed across the block so as to overlay the magnet 26. The wires may be fixed to the surface of the block 34 as by soldering the ends thereof directly to the copper block, or by epoxying or otherwise adhesively securing the wires at their ends to the block. As the operative principle of the present invention does not require electrical conductivity with respect to the wires 12 and 14, each of the wires 12 and 14 may be uninsulated and may directly contact the block 34. The *y* array wires 14 may be then placed over the *x* wires 12, in orthogonal relationship therewith. The *x* and *y* array may contact each other or may be separated by a thin mylar or other form of separating sheet of material. Again, conductivity is not a factor, although the use of an insulating separating sheet may be preferable.

The pick-up wires 16 and 18 are respectively positioned over the corresponding *x* and *y* wires, and directly over their respective magnets. To reduce positional error, the position of the pick-up wires should be such as to be orthogonally located with respect to the corresponding array. As will be set forth below, this position may easily be determined during calibration.

Finally, the device may be completed by an overlaying member 36 positioned so as to form a solid writing surface across the top of the block 34 thereby providing a smooth surface upon which a document may be placed for interaction with the field generating device 30.

As a further alternative the space between the upper member 36 and the block 34 may be filled with a fluid or other non-adhering or non-damping substance. The contact to the respective *x* and *y* wires should be minimal, preferably limited to the tangential contact such as shown in the cross-sectional view of FIG. 2. Since the operative principle of the present invention requires strain wave transmission by a longitudinal mode of vibration through the magnetostrictive wires 12 and 14 as will be explained in further detail below, the freedom of movement of the wire should not be restricted. It should be noted, however, that the longitudinal mode of vibration utilized in the present invention is not damped by limiting transverse or torsional movement of the magnetostrictive wires.

Figure 3:
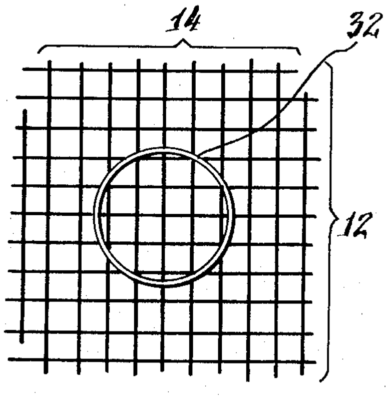
FIG. 3 is a detail of the relationship between the field generation device and the wire array.

Referring now to FIG. 3, the array of wires is illustrated with respect to the position of the energizing field coil 32. In typical configuration the wire 12 and 14 may have a density in the orders 20 lines per inch, whereas the coil 32 may encompass as few as one or as many lines as may be desired. Typically, however, the coil will encompass approximately five lines within its diameter.

Figure 4:
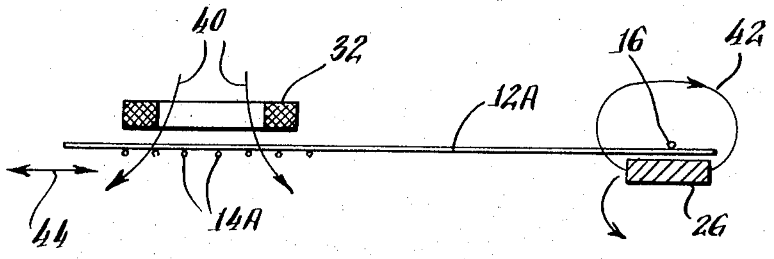
FIG. 4 is a cross sectional view illustrating in detail the flux and field arrangement employed in conjunction with the present invention.

Referring now to FIG. 4, the principle of the invention is illustrated in greater detail. As was noted above, the operative principle in the present invention utilizes a longitudinal vibrational mode of strain wave propagation. Thus, the energizing field generation which is provided by the generation of a pulse through the coil 32 results in the induction of a magnetostrictive disturbance into the magnetostrictive array wire designated in FIG. 4 as 12A for purposes of illustration. The positioned field generating coil 32 may be located at any point laterally along the line 12A corresponding to a position to be digitized. The field is generated by an electrical pulse and is illustratively evidenced by the field lines 40. The field lines 40 set up a magnetostrictively induced disturbance into the magnetostrictive line 12A as well as the corresponding coordinate line 14A. The nature of the magnetostrictive disturbance will be to set up a strain wave manifested as a vibration in the longitudinal mode along the axis of the line 12A and 14A as a result of the magnetic field lines 40. The magnetostrictive pulse induces a strain corresponding to the vibration into the wire and travels along the longitudinal axis of the wire at the speed of sound in metal, a factor determined in proportion to the square root of the ratio between Young's modulus and the wire density. In a nickel chromium vanadium composition alloy such as the Remandur P described above, the velocity will be at nominally 5,000 meters per second.

The only criterion required of the transmission media is that the speed of the wave be fast enough to provide the requisite resolution desired in the digitization, and yet be slow enough to enable a significant count level to be achieved in digitizing the time delay.

The longitudinal mode vibration travels down the magnetostrictive wire until it reaches the area of the pick-up wire 16. The strain on the wire causes a change in permeability which results in a change of flux, inducing a voltage in the pick-up 16 which is then detected and amplified through the pick-up unit 22 as shown in FIG. 1. The magnet 26, by providing the field 42, serves to provide a higher signal to noise ratio because it produces a higher flux and hence higher flux change. It will be appreciated, however, that the magnet 26 is not essential, and that the magnetostrictive wires may be premagnetized to a remanent condition to establish the necessary flux for a change in permeability through the pick-up wire 16. The foregoing description, although made in connection with the *x*-axis wire array, is equally applicable to the use of the *y*-axis in line 14A, and it will be evident that the same comments apply to the pick-up wire 18 and the permanent magnet 28.

It will be understood that longitudinal mode vibration, analogous to compression and expansion waves traveling along an axis generally designated as 44 in FIG. 4, differs from other vibrational modes. For example, transverse mode vibration, analogous to the movement of a violin string, would produce movement in the plane orthogonal to the axis 44 as either up or down or transverse motion which would result in heavy damping of the vibration by means of a contact with the surface 34. A further vibrational mode, torsional vibration, such as is evident in conventional magnetostrictive delay lines would also encounter extreme vibration damping as a result of longitudinal contact with the magnetostrictive wires. The present invention results in use of the longitudinal mode of vibration along the long axis of the respective wires, which mode is extremely difficult to damp physically merely by making tangential contact with the wires as is illustrated in FIG. 2. Thus, the use of the longitudinal vibrational mode is significant in creating the strain wave effect which varies permeability and resulting in a flux change in pick-ups 16 and 18.

Figure 4A:
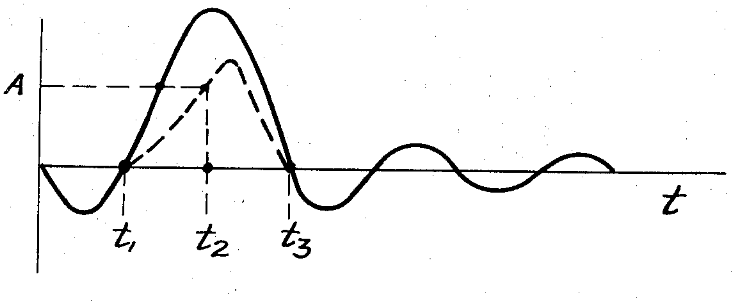
FIG. 4A is a waveform diagram illustrating the timing of the strain wave.

Referring to FIG. 4A, the nature of the pulse induced into the magnetostrictive line is illustrated. As shown, the strain of the pulse induced magnetostrictively into the line 12A produces a characteristic wave form having an initial and a subsequent zero crossing. The initial zero crossing at $t_1$ reaches a designated threshold at magnitude A which will have a time period from $t_1$ depending upon the magnitude of the initial peak. Thus, for example, should the amplitude of the induced signal be decreased, the threshold A will occur at a slightly delayed time $t_2$. However, since the pulse width depends only on the speed of propagation of the longitudinal pulse, and not upon the amplitude of the pulse, the wave will reach its subsequent zero crossing $t_3$ in a manner such that the time period between $t_1$ and $t_3$ will also be a constant. Thus, in determining the actual position at which to employ the picked up signal caused by the variation of the permeability due to the strain of the magnetostrictive pulse, it is convenient to use the second zero crossing $t_3$.

Figure 5:
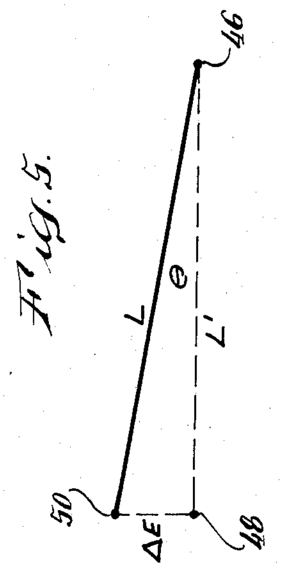
FIG. 5 is a diagram illustrative of the relative error configuration governing the operation of the present invention.

The particular arrangement illustrated in FIG. 1 has certain distinct advantages with regard to reducing digitizing error in positioning. In an arrangement wherein the array of wires 12 and 14 may be slightly skewed or otherwise offset, the use of the present invention in providing for the digitization of the time period of the traverse from the location to be digitized to the pick-up point results in a significantly reduced error in proportion to a skewed wire location. Referring to FIG. 5, if a digitizer location designated at point 46 is positioned such that the actual positioning thereof corresponds to the terminus at a point 48, but the wire designated L terminates at a point 50, use of the present invention results in an error proportional to the cosine of the angle representing the different positions between 48 and 50 relative to the point 46. Thus, the error actually represents the difference between the length of the line L and the length of the ling L′ in terms of total digitization. If the pick-up position were determined by the transverse axis corresponding to the line running through the points 48 and 50, the actual digitized error would correspond to ΔE or proportional to the sine of the angle $\theta$. Thus, an arrangement where a delay line is employed at the terminus of the wire array corresponding between the points 48 and 50, or wherein digital circuitry is employed to detect the appearance of a pulse at the end of a line 48 or 50 corresponding to a position the actual position error would be a digitization corresponding to ΔE rather than a digitization corresponding to the difference between L and L′. Utilization of the concept of the present invention, therefore, results in a significant incrase in accuracy since the error ΔE is significantly greater than the error represented by the different length of the line L and L′. Stated conversely, much lower manufacturing costs, due to the need for lower tolerances, may be employed to achieve comparable errors.

Figure 6:
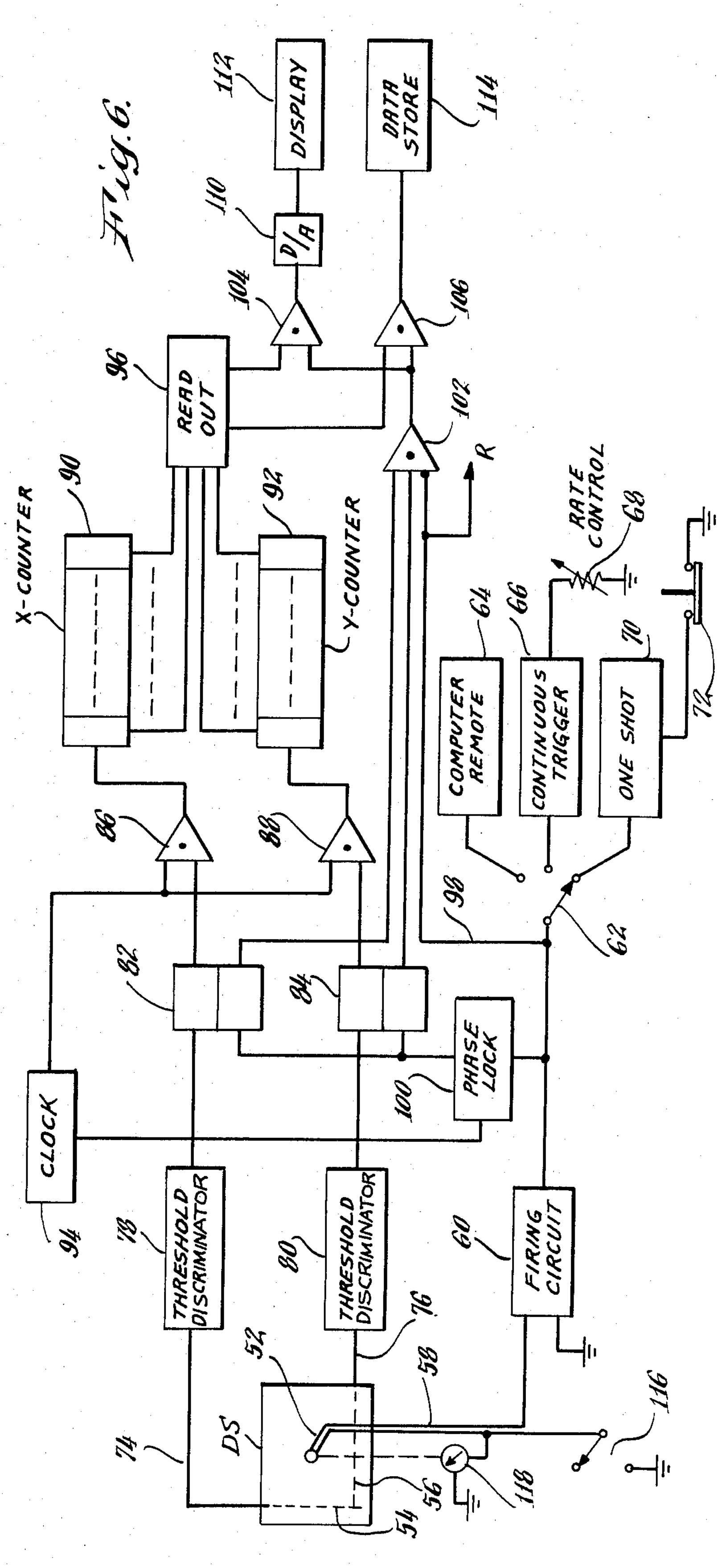
FIG. 6 is a schematic diagram of the data implementation for utilization of the present invention.

Referring now to FIG. 6, the utilization of the present invention in conjunction with a suitable circuitry is illustrated in schematic form. As shown, the data surface DS includes the positionable field generating device 52 movable about a series of coordinates which are to be digitized with respect to the pickup lines 54 and 56. As was explained above, the field generator 52 may be in the form of a stylus or cursor having a coil or other field generating means at the tip thereof and coupled by means of a conductor 58 to a firing circuit 60 which provides the high energy pulse necessary to trigger the magnetic field into the array. The firing circuit is in turn energized by means of triggering pulses derived by any suitable means from an external source. The manner of introduction of trigger pulses may be controlled by means of a multiple position mode switch 62. For example, a computer or like remote control source 64 may be employed to provide triggering pulses, a continuous trigger circuit 66 may be provided with the inclusion of a rate control 68 for varying the frequency of the pulses supplied thereto, or a manually operated single pulse control circuit such as a one shot 70 may be provided with a manually operated switch 72 for providing a manually controlled pulse rate from the one shot 70. The continuous trigger 66 and one shot 70 may be of conventional form, and the computer control terminal 64 may be derived from a computer or from any externally derived source of triggering signals.

Figure 7:
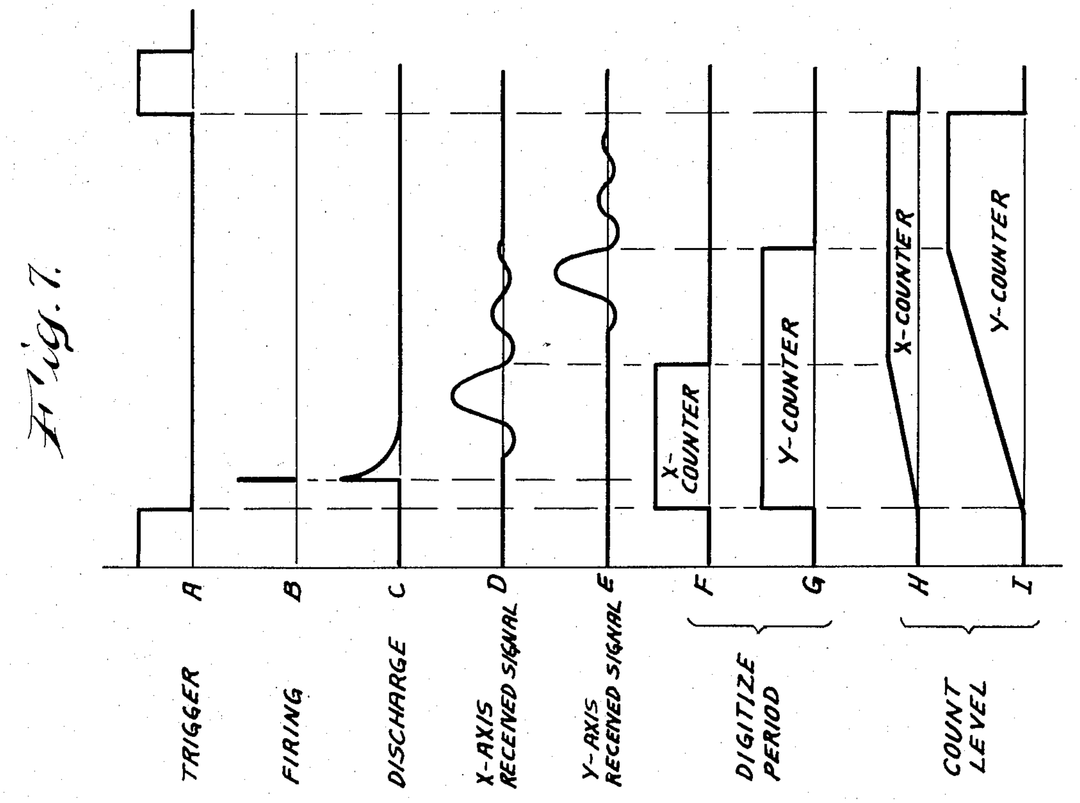
FIG. 7 is a waveform diagram illustrating the operation of FIG. 4.

The *x* and *y* generated magnetostrictive disturbances are picked up by the respective pickup lines 54 and 56 and applied along respective output lines 74 and 76 to threshold discriminators 78 and 80. The threshold discriminators operate to sense the first zero crossing after the achievement of a minimal threshold as was discussed in conjunction with FIG. 4A, and provide an output pulse corresponding to the appearance of the zero crossing signal. The outputs of the threshold discriminators 78 and 80 are coupled to the respective inputs of a conventional bistable flip-flop network 82 and 84. One output of each flip-flop is gated through a coincident gating network such as the AND gate 86 and 88 into an *x* channel counter 90 and a *y* channel counter 92 respectively. The gates 86 and 88 also respectively receive a clock input from a clock pulse generator 94. The counters 90 and 92 are each coupled to a read out device 96 which may be any conventional form of interim storage device or transfer register. With specific reference to FIG. 7, the external source of initiation of a signal passing through the switch 62 (FIG. 7A) acts to trigger a pulse from the firing circuit 60 (FIG. 7B) and initiate a field in the field generating device 52 (FIG. 7C). The trigger signal is also conducted simultaneously along the line 98 to a reset terminal R wherein the leading edge of the trigger pulse is employed to reset the counters 90 and 92 in a conventional manner. At the same time, the trigger signal is conducted simultaneously to each of the flip-flops 82 and 84 through a phase lock circuit 100.

The phase lock circuit 100 will delay the triggering of the flip-flop 82 and 84 for time periods sufficient to insure that a full width clock pulse will be provided from the clock pulse generator 94 to the gates 86 and 88. The effect of the trigger signal in the flip-flops 82 and 84 is to set each flip-flop in the state permitting the gates 86 and 88 coupled thereto to pass clock pulses from the clock source 94. As a result, the X-counter and Y-counter each begin to accumulate a digital count (FIG. 7, F and G, FIG. 7H and I). The count continues to accumulate until the appropriate signal is received from the threshold discriminator 78 and 80 corresponding to the first 0 crossing after passage of the minimal threshold level set in the threshold discriminator circuits (FIG. 7 D and E). Production of a pulse at this point by the threshold discriminators 78 and 80 act to reset the flip-flops 82 and 84, thereby blocking the action of the gates 86 and 88 and causing a cessation of the counter accumulation (FIG. 7D and F, E and G, trailing edge). The period between trigger pulses is sufficient to allow the X axis and Y axis received signals to damp out prior to initiation of the next successive trigger pulse. The counter reset operation as described above is effected on the leading edge of the trigger pulse and the unblocking of the AND gates on the trailing edge.

As will be noted in FIG. 7, A and B, there is a time delay preset between trigger and firing such that the firing of the firing circuit 60 occurs at a spaced duration from the trailing edge of the trigger pulse. The effect of this is to introduce a slightly higher accumulated count into the X-counter and Y-counter since the counters will begin to accumulate pulses on the trailing edge of the triggering circuit pulse, FIG. 7A. The reason for this is, as will be noted in FIG. 3, that the position coordinate will be determined by the position at which field lines cut the appropriate magnetostrictive wire in proximity thereto. If it is the center of the loop 32 which is desired to be digitized, then there will be a slight positional offset equal to the radius of the loop 32 in both the X and Y direction. By presetting the delay between the trigger and firing, FIG. 7A and 7B, additional counts may be provided to the X and Y counter to compensate for the fixed offset. Since the loop radius is a fixed quantity, the offset will be the same in each case no matter where the loop is with respect to the array.

Returning to FIG. 6, the complementary outputs of the flip-flops 82 and 84 are respectively coupled to a further AND gate 102. This latter AND gate is coincidentally energized only during the period after the count accumulation is complete but before the reset periods when both flip-flops 82 and 84 are in their reset state. This will provide a "data ready" indication which may be utilized for transferring the accumulated count to an appropriate output by means of energization of the coincident gates 104 and 106. For purposes of illustration, the gate 102 may be employed in conjunction with an externally applied signal conveyed through the read-out circuit 96 to energize either the gate 104 or 106 when it is desired to make specific use of the information. For example, energization of gate 104 will permit the information to flow to a digital-to-analog conversion circuit 110 for conversion to signal forms suitable for display on a suitable display device 112. A display device may be a conventional form of cathode tube display or storage scope or the like. Alternatively, it may be desired to store the information in a computer or other form of permanent data store, in which event the gate 106 would be energized in a read-out supplied from the read-out circuit 96 through the data storage device 114. It is also possible to couple the data signals through a prestored read only memory to transform data formats.

In addition to the mode illustrated, a switch 116 may be provided which will operate in conjunction with a further switch 118 to cause several varied operations. For example, the switch 116 will, when in its upper position, permit the use of the pressure switch 118 to cause generation of the magnetic field in the field device 52 when pressure is applied to the device 52 when employed in the form of a writing implement. If utilized in conjunction with the switch 62 in its continuous trigger position, the triggering pulses will be activated only in conjunction with actual pressure being applied to the field generating device 52. Thus the field generating device 52 may be incorporated as part of a pressure utilization device such as a writing implement, thereby permitting the use of hard copy generation simultaneously with real time digitization. When switch 116 is in its down position, the pressure switch becomes inoperative and the pulse circuit 60 provides activation into the field generation device 52 in accordance with the mode supplied through the mode selection switch 62. Thus, if the field generation device 52 is a cursor movable about a fixed plane for digitization purposes, selection of the appropriate input mode through the mode switch 62 will provide the desired digitization.

Figure 8:
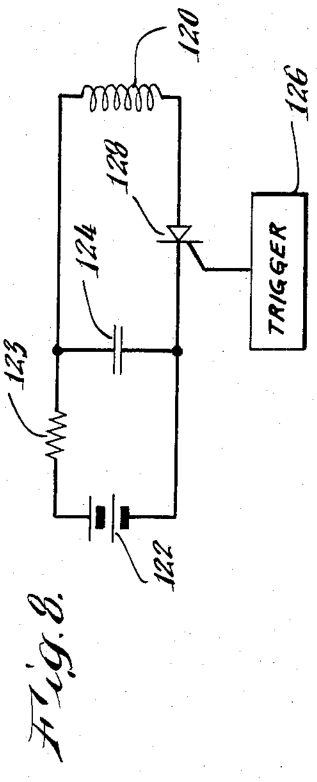
FIG. 8 is a schematic diagram of the circuit employed for triggering the field.

Referring to FIG. 8, a suitable circuit for providing the field generation is illustrated. As shown, the field coil 120 is connected across the source of Dc supply 122 which is in turn connected across a storage capacitor 124, through a resistor 123. In normal operation, the source of supply 122 charges up the capacitor 124. When it is desired to provide the field generation, a triggering pulse supplied from the trigger 126 which may in turn be derived from the mode selection switch 62, as illustrated in FIG. 6, fires a suitable triggering device such as the SCR 128. As a result, the stored energy of the capacitor 124 is dumped through the coil 120, thereby providing the high intensity field required. In preferred form, it may be possible to employ a voltage of on the order of several hundred volts (for example, 200 volts) stored into a capacitor having a capacitance on the order of several tenths of a microfarad (for example 0.1 mfds) discharging through a 10 turn copper coil wound around a ¼ or ⅛ inch diameter. The number of turns as well as the diameter of the coil may be varied in accordance with the desired field generation. As was stated above, the use of ferrite core in the field coil will improve the signal strength and concentrate the field.

Figure 9:
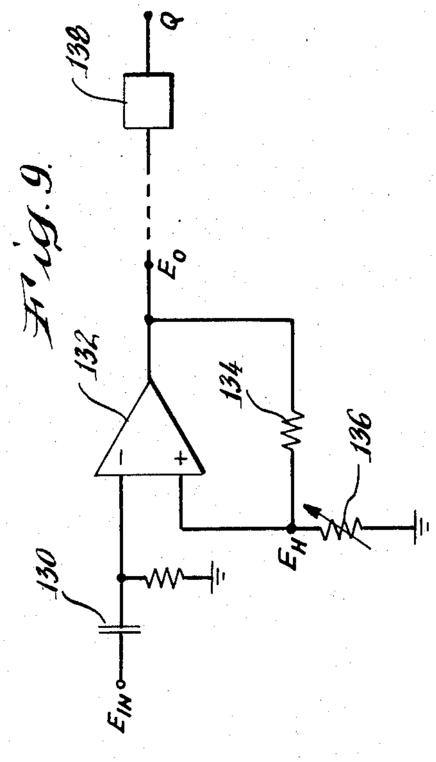
FIG. 9 is a detail of the threshold discriminator employed in connection with the present invention.
Figure 10:
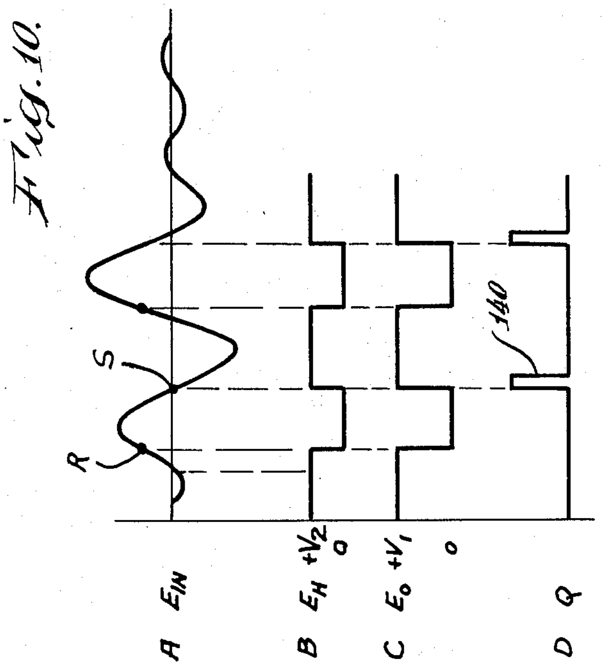
FIG. 10 is a timing diagram of the device shown in FIG. 9.

Referring to FIG. 9, a suitable threshold discrimination circuit is illustrated. As was described above, it is the function of this circuit to detect the input signal received by the pick-up lines as a result of the permeability change caused by the strain resulting from the vibrational mode induced magnetostrictively into the wires of the array. The characteristic desired is the passage of a minimum threshold and a trigger pulse provided at the end of the first zero-crossing thereafter. Referring to FIG. 10, the E in signal (FIG. 10A) corresponds to the signal provided at the input of the threshold circuit. It is noted that this signal includes subsequently received pick-up pulses caused by the additive effect of pluralities of lines providing pulses to the pick-up. However, it is the first peak which determines the most accurate digitization location. The circuit of FIG. 9 includes an input capacitor and resistance network, designated generally as 130, a comparator 132 and a resistance network 134 and 136 intercoupled between the output of the amplifier 132 and an input thereof, and a common or ground point. The resistance 136 is variable and determines the point at which the hysteresis of the circuit of FIG. 9 is set. The object is to use the threshold crossing R to set the device and the next subsequent zero-crossing to provide an output pulse in correspondence thereto. Thus, during quiescence, the output voltage Eo is at some fixed value +V1, and the comparator voltage is set at a predetermined threshold level +V2. Assuming the peak of Ein is higher than the threshold value R, the Ein voltage will rise to a point R, equal to V2, whereupon the circuit will trigger, driving the output Eo from its value +V1 to 0 (FIG. 10C) in turn driving EH to a 0 voltage condition, (FIG. 10B).

Since the comparator threshold is now set at a 0 level, passage of the input signal Ein through the zero position, point S in FIG. 10A, will trigger the comparator output Eo to its initial value, +V1. At the same time, EH will reset to its initial value through the resistance divider network 134/136. The positive going waveform, (FIG. 10C), corresponding to the point S, is employed to trigger a one shot 138, the nature of which is to provide a short term pulse 140 (FIG. 10D), which is used to reset the flip-flops 82 and 84 shown in FIG. 6. The nature of the circuit of FIG. 9 will result in the production of a plurality of pulses 140. However, the nature of the arrangement of FIG. 6 is such that the flip-flops 82 and 84 will reset upon the receipt therein of the first reset pulse from the respective threshold discriminator, and thus the subsequent pulses are not relevant.

It will be evident that other forms of discrimination devices may be realized which can perform the reset function under the foregoing conditions, and that the circuit of FIG. 9 is merely exemplary of a particular mode of thresholding.

When fully assembled, the nature of the inventive concept permits ease of calibration. The pick-up wires should be positioned orthogonally with respect to the wires of their respective coordinate array, to minimize error. The calibration thus may comprise digitizing a right triangle upon the array, and insuring a correspondence in the digitization at the respective points of the triangle. Upon correspondence, the calibration is complete.

Thus, there has been described a novel mechanism for position location employing a vibrational mode of transmission. The concept of the present invention may be employed in alternative formats. For example, the magnetostrictive wires described herein may be flat as well as round in cross section, as may be the pick-up wires. Further, although only one pick-up wire is illustrated for each dimensional coordinate, it is within the scope of the present invention to employ more than one pick-up wire, such as at opposite ends of a coordinate. This latter configuration may provide benefit as a means of error checking as well as providing redundant back up. Also, it is possible to reverse the nature of the pulsing scheme, as by utilizing the pick-up wire to induce a magnetostructive pulse in the array along respective coordinate lines, and to employ the stylus or cursor as a pick-up.

Other configurations, as well as modifications, alternatives, omissions, refinements and substitutions will be apparent to those skilled in the art, as within the inventive scope, and although certain embodiments and descriptions have been provided, it is to be understood that various further configurations, modifications, alternatives, omissions, refinements and substitutions which depart from the disclosed exemplary embodiments may be adopted without departing from the spirit and scope of the invention.

What is claimed is:

1. A digitizing position determination device comprising, magnetostrictive transmission means arrayed about a data surface area defined by a plurality of planar coordinates, pick-up means coupled to said magnetostrictive transmission means and responsive to transmissions from each of said planar coordinates of said magnetostrictive transmission means, field generating means coupled to said magnetostrictive transmission means for generating a magnetostrictive transmission in each of said planar coordinates of said magnetostrictive transmission means, said pick-up means and said field generating means being relatively displaceable from each other across said planar coordinates of said magnetostrictive transmission means, a signal source for providing an energizing signal, first means responsive to said energizing signal for energizing said field generating means and generating thereby a magnetic field of a magnitude sufficient to magnetostrictively induce a vibrational mode into said magnetostrictive transmission means proximate said field generating means, said vibration propagating along said magnetostrictive transmission means at a predetermined velocity, said pick-up means responsive to said vibrational mode in said magnetostrictive means for providing a data signal, second means responsive to said signal source for initiating digitization in digitizing means corresponding to a coordinate position, and third means responsive to said data signal from a coordinate position for stopping said digitization for said coordinate position, the accumulated digitization in said digitizing means therein representing the time of transit of said vibrational mode from said field generating device to said pick-up means, thereby providing a digitized coordinate position of the position of said pick-up means relative to said field generating device.

2. The device of claim 1 wherein said transmission means comprises an array of spaced wires positioned along a coordinate axis of said surface.

3. The device of claim 2 wherein each of said wires are magnetostrictive.

4. The device of claim 1 wherein said transmission means comprises an array of spaced wires positioned along orthogonal coordinate axes of said surface.

5. The device of claim 4 wherein each of said wires are magnetostrictive.

6. The device of claim 1 wherein said transmission means comprises an array of spaced wires positioned along a coordinate axis of said surface and said vibrational mode of propagation is longitudinal with respect to the long axis of each of said wires.

7. The device of claim 1 wherein said first means is positionable about said surfaces at a series of locations to be digitized, and said pick-up means is fixed positioned at the edge of said surface.

8. The device of claim 1 wherein said pick-up means provides a varying signal corresponding to said propagating vibration, and wherein said third means includes a threshold discriminator, said threshold discriminator responsive to the first zero crossing of said signal after a predetermined threshold condition for determining the end of said propagation time.

9. The device of claim 1 wherein said third means includes digitizing means, said digitizing means responsive to said second means to begin digitization and to said pick-up means to terminate said digitization, the net digitization thereby representing said time of propagation.

10. A coordinate digitizer comprising:

a first plurality of magnetostrictive wires arrayed along a first coordinate of a data surface, a first pick-up means commonly coupled to said first plurality of wires;

a second plurality of magnetostrictive wires arrayed along a second coordinate of said data surface;

a second pick-up means commonly coupled to said second plurality of wires;

a positionable field generating device, said positionable field generating device movable about said data surface proximate said first and second plurality of magnetostrictive wires;

a signal source for providing an energizing signal;

first means responsive to said energizing signal for energizing said positionable field generating device and generating thereby a magnetic field of a magnitude sufficient to magnetostrictively induce a longitudinal mode vibration into said magnetostrictive wires proximate said positionable field generating device, said vibration propagating along the length of said magnetostrictive wires at a predetermined velocity;

said pick-up means each responsive to a vibrational mode in a magnetostrictive wire associated therewith for providing a data signal;

second means responsive to said signal source for initiating digitization in a first digitizer corresponding to said first coordinate and in a second digitizer corresponding to said second coordinate; and, third means responsive to said data signal in each respective coordinate for stopping said digitization of each said digitizer in a respective coordinate, the accumulated digitization in each digitizer therein representative of the time of transit of said vibrational mode from said positionable field generating device to each respective coordinate pickup means, and thereby providing a digitized coordinate position of said device with respect to said data surface.

11. The digitizer of claim 10 wherein said first and second coordinates are orthogonally positioned.

12. The digitizer of claim 10 wherein said first and second pickup means are orthogonally positioned with respect to said first and second plurality of wires respectively.

13. The digitizer of claim 10 wherein said positionable field generating device includes a plurality of turns of conductive wire about a ferrite core.

14. The digitizer of claim 10 wherein said data signal has a damped oscillatory characteristic and said third means includes a threshold discriminator, said threshold discriminator responsive to the first zero crossing of said data signal after passage through predetermined threshold condition for providing a gating signal, and gating means, coupled to each said digitizer and responsive to said gating signal for stopping said digitization.

15. The combination of claim 10 wherein said third means includes a first and second threshold discriminator coupled to each said pickup means, each said threshold discriminator providing an output signal corresponding to the activation of a pickup means by said vibration, first and second bistable devices each having a first input coupled to said signal source for placing said bistable devices in a set condition, and a second input coupled to each respective threshold discriminator and responsive to an output signal therefrom for resetting each said bistable device, a source of counting signals, gating means coupling said source of counting signals to said first and second digitizers, said gating means coupled to each respective bistable device and responsive to a set condition in said first bistable device for passing said counting signals from said source of counting signals to said first digitizer, and to a set condition in said second bistable device for passing said counting signals from said source of counting signals to said second digitizer, said bistable devices each responsive to a respective reset signal from a respective threshold discriminator for stopping count accumulation in the digitizer associated therewith.

16. The digitizer of claim 10 wherein each of said pick-up means includes a permanent magnet aligned therewith.

* * * * *